United States Patent
Nakayama et al.

(10) Patent No.: US 6,225,490 B1
(45) Date of Patent: *May 1, 2001

(54) CONTINUOUS HYDROLYSIS OF ORGANOCHLOROSILANES

(75) Inventors: Hiroshi Nakayama; Naoyuki Ida; Hiroyuki Kobayashi; Yukinori Satoh; Yoshihiro Shirota; Masaaki Furuya, all of Annaka (JP)

(73) Assignee: Shin-Etsu Chemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,786

(22) Filed: May 27, 1998

(30) Foreign Application Priority Data

May 28, 1997 (JP) ..................................................... 9-154448

(51) Int. Cl.⁷ ........................................................ C07F 7/04
(52) U.S. Cl. ............................ 556/462; 556/449; 556/450; 556/451; 556/453; 556/458; 556/460; 556/462; 528/10; 528/12
(58) Field of Search ................................... 556/451, 453, 556/450, 459, 460, 458, 462, 449; 528/10, 12

(56) References Cited

U.S. PATENT DOCUMENTS

| | | | |
|---|---|---|---|
| 2,758,124 | * 8/1956 | Schwenker | .................. 260/448.2 |
| 2,832,794 | * 4/1958 | Gordon | .............................. 260/448.2 |
| 4,609,751 | 9/1986 | Hajjar . | |
| 5,476,916 | 12/1995 | Pachaly et al. . | |

FOREIGN PATENT DOCUMENTS

| | | |
|---|---|---|
| 3202558 | 8/1983 | (DE) . |
| 658588 | 12/1994 | (EP) . |
| 2518099 | 12/1982 | (FR) . |
| 2743812 | 1/1996 | (FR) . |

* cited by examiner

Primary Examiner—James O. Wilson
(74) Attorney, Agent, or Firm—Millen, White, Zelane & Branigan, P.C.

(57) ABSTRACT

For the continuous hydrolysis of organochlorosilane, a reaction system comprising at least three stages of hydrolysis is used. Each stage includes a reactor and a phase separator wherein hydrolysis is effected to form a hydrolysis mixture which is separated into a hydrolyzate and a hydrogen chloride-containing aqueous medium. The separated aqueous medium is circulated to the reactor. The hydrolyzate is conveyed to the reactor of the subsequent stage. The organochlorosilane is fed into the first stage reactor, the aqueous medium containing an amount of water corresponding to the consumption in one stage is fed into one stage reactor from the subsequent stage, and an amount of water corresponding to the consumption in the overall reaction system is fed in the last stage. Then the entire amount of hydrogen chloride generated in multiple stages of hydrolysis is recovered as anhydrous hydrogen chloride from the first stage. The entire amount of the aqueous media separated in the phase separators is retained in the reaction system.

17 Claims, 1 Drawing Sheet

CONTINUOUS HYDROLYSIS OF ORGANOCHLOROSILANES

BACKGROUND OF THE INVENTION

1. Field of the Invention

This invention relates to a method for the continuous hydrolysis of organochlorosilane and more particularly, to a method for the continuous hydrolysis of organochlorosilane comprising the steps of feeding organochlorosilane from a first stage of hydrolysis, maintaining constant the level of a hydrogen chloride-containing aqueous medium in each stage, and feeding an amount of water corresponding to the consumption by reaction from the last stage.

2. Prior Art

Various silicone products as typified by silicon oil and silicone rubber are produced from diorgano-hydrolyzate intermediates which are produced by hydrolysis and polycondensation of diorganodichlorosilane. In this process, since the quality of silicone products is directly governed by the hydrolysis reaction, those skilled in the art must pay attention to the physical properties and state of hydrolyzate and the stability of operation. For example, if the proportion of linear polysiloxane having a high molecular weight increases, the loads for phase separation and transfer increase. Therefore, for carrying out stable operation, it is desirable to produce cyclic polysiloxane in relatively high yields.

The above reaction generates hydrogen chloride as a by-product. Since hydrogen chloride is a valuable raw material for the synthesis of methyl chloride, it is also important to increase the recovery rate of hydrogen chloride.

Paying attention to these problems, those skilled in the art have sought for industrially more advantageous operation.

For example, U.S. Pat. No. 2,758,124 discloses a method of continuously feeding organochlorosilane and hydrochloric acid into a reactor, thereby producing linear and cyclic polysiloxanes and an aqueous hydrogen chloride solution having a concentration of 25 to 36% by weight. The aqueous hydrogen chloride solution thus generated is distilled and separated into a hydrogen chloride-water azeotrope having a hydrogen chloride concentration of 21% by weight and anhydrous hydrogen chloride for reuse. According to this method, linear or cyclic polysiloxane having a hydroxyl group at an end is obtained as a product, the amounts of terminal Cl⁻ groups and residual hydrogen chloride concomitant with the polysiloxane product can be reduced. This method, however, is disadvantageous from the energy standpoint because distillation operation is carried out upon recovery of hydrogen chloride. Since a noticeable amount of organopolysiloxane is dissolved in the recovered aqueous hydrogen chloride solution, the subsequent steps must include washing steps, complicating the process. Continuous operation is sometimes interrupted due to scale deposition.

To avoid these drawbacks, U.S. Pat. No. 4,382,145 discloses a method of hydrolyzing organochlorosilane, utilizing an aqueous hydrochloric acid solution containing at least 35% by weight of hydrogen chloride, as the source of water for the organochlorosilane hydrolysis, in an amount sufficient to provide a molar ratio of water to organochlorosilane of from about 10 to about 30. This method yields a polysiloxane mixture, anhydrous hydrogen chloride, and an aqueous medium containing a saturated amount of hydrogen chloride, saving the majority of energy required for the recovery of hydrogen chloride. However, if the aqueous medium containing a saturated amount of hydrogen chloride is used, terminal Cl⁻ groups and residual hydrogen chloride are left in the organopolysiloxane mixture, leading to a substantial drop of reactivity.

The drop of reactivity not only introduces inconvenience into subsequent steps, but causes a substantial drop in phase separation between the polysiloxane product and the aqueous medium containing hydrogen chloride, increasing the loads for phase separation and transfer. Further, since terminal Cl⁻ groups or hydrogen chloride left in the organopolysiloxane is washed away in the subsequent step, a substantial amount of hydrogen chloride is lost together with the wash liquid.

U.S. Pat. No. 4,609,751 discloses a method of hydrolyzing organochlorosilane in substantially a stoichiometric equivalence of water. This method is advantageous from the energy standpoint since anhydrous hydrogen chloride can be readily obtained. This method, however, is disadvantageous in phase separation and effective utilization of hydrogen chloride as in the previous methods.

U.S. Pat. No. 5,476,916 discloses a method of carrying out the hydrolysis of alkylchlorosilane in two stages. In the first stage, alkylchlorosilane is reacted with water in aqueous hydrochloric acid to produce anhydrous hydrogen chloride and polysiloxanes. In the second stage, water is supplied as steam to reduce the chlorine content of the polysiloxanes. Since a large amount of water must be fed as steam into the reaction system, an excessive quantity of energy is necessary and the system becomes complex.

Although those skilled in the art have made investigations on the continuous hydrolysis of organochlorosilanes, a method capable of energy saving and stable operation has yet never been available.

The hydrogen chloride-containing aqueous medium resulting from the hydrolysis step of diorganodichlorosilane contains siloxane which is present partially dissolved and partially dispersed in the aqueous medium and in a concentration ranging from several tens of ppm to about 10,000 ppm depending to the hydrogen chloride concentration. This makes more difficult the reuse of the hydrogen chloride-containing aqueous medium and causes to incur a loss of siloxane. In the event where the aqueous medium is drained after waste water treatment including a neutralizing step with alkali solution, a large amount of alkali is necessary, prevention of siloxane run-off is very difficult, and the environmental influence is serious.

Therefore, it is an industrially important task to carry out hydrolysis of organochlorosilane in an energy-saving manner while maintaining the physical properties of hydrolyzate and stable operation and to recover substantially the entire amount of hydrogen chloride generated in the reaction system as anhydrous hydrogen chloride.

SUMMARY OF THE INVENTION

An object of the invention is to provide method for the continuous hydrolysis of organochlorosilane wherein by feeding organochlorosilane to the first stage of hydrolysis, maintaining constant the level of a hydrogen chloride-containing aqueous medium in each stage, and feeding into the last stage an amount of water corresponding to the amount of water consumed by reaction, it becomes possible to maintain the physical properties of hydrolyzate and stable operation, to recover substantially the entire amount of hydrogen chloride generated in the reaction system as anhydrous hydrogen chloride, and to retain within the reaction system substantially the entire amount of aqueous media separated in phase separators.

The invention addresses a commercially advantageous method for the continuous hydrolysis of alkylchlorosilane, and especially a method for the continuous hydrolysis of organochlorosilane which is advantageous from the energy standpoint and yields a hydrolyzate having satisfactory physical properties. The method for the continuous hydrolysis of organochlorosilane uses a reaction system comprising multiple stages of hydrolysis reaction, each stage including a hydrolysis reactor and a phase separator wherein the hydrogen chloride-containing aqueous medium separated in the phase separator is circulated to the reactor. We have found that by feeding the organochlorosilane into the reactor of the first stage, feeding the aqueous medium containing an amount of water corresponding to the amount of water consumed in one stage to the one stage from the subsequent stage, and feeding in the last stage an amount of water corresponding to the amount of water consumed in the overall reaction system, substantially the entire amount of hydrogen chloride generated in multiple stages of hydrolysis reaction can be recovered as substantially anhydrous hydrogen chloride from the first stage, and substantially the entire amount of the aqueous media separated in the phase separators can be retained in the reaction system.

According to the invention, there is provided a method for the continuous hydrolysis of organochlorosilane to produce organopolysiloxane, using a reaction system comprising multiple stages of hydrolysis reaction, each stage including a hydrolysis reactor for hydrolyzing the organochlorosilane to form a hydrolysis mixture and a phase separator for effecting phase separation on the hydrolysis mixture into a hydrolyzate and a hydrogen chloride-containing aqueous medium, the aqueous medium being circulated from said phase separator to said hydrolysis reactor, wherein the hydrolyzate obtained in one stage is conveyed to the hydrolysis reactor of the subsequent stage to effect further hydrolysis. The method is characterized in that the organochlorosilane is fed into the hydrolysis reactor of the first stage, the aqueous medium containing an amount of water corresponding to the amount of water consumed in one stage is fed to the one stage from the subsequent stage, and an amount of water corresponding to the amount of water consumed in the overall reaction system is fed in the last stage, whereby substantially the entire amount of hydrogen chloride generated in multiple stages of hydrolysis reaction is recovered as substantially anhydrous hydrogen chloride from the first stage and hence, from the reaction system, and substantially the entire amount of the aqueous media separated in the phase separators is retained in the reaction system.

According to the invention, a neutral polysiloxane mixture typically having a viscosity of 5 to 15 mPa·s, a residual chloride concentration of up to 100 ppm and a cyclic siloxane content of 55 to 70% can be produced in a consistent manner.

In the above method, when the aqueous medium separated in the first stage of hydrolysis reaction has a hydrogen chloride concentration of 35 to 45% by weight, a fully high rate of hydrolysis is obtained and the physical properties of siloxane become stable. When the reaction pressure of the first stage is from more than 0 kgf/cm$^2$G to 5.0 kgf/cm$^2$G and the reaction temperature of the first stage is from above 35° C. to 90° C., it becomes easy to maintain the hydrogen chloride concentration of the aqueous medium. When the reaction system includes at least three stages of hydrolysis reaction, the chloride concentration of organopolysiloxane is reduced so that the organopolysiloxane becomes of better quality.

The anhydrous hydrogen chloride recovered from the reaction system can be directly used for the synthesis of alkylchloride.

BRIEF DESCRIPTION OF THE DRAWINGS

The only figure.

DETAILED DESCRIPTION OF THE INVENTION

Figure 1:
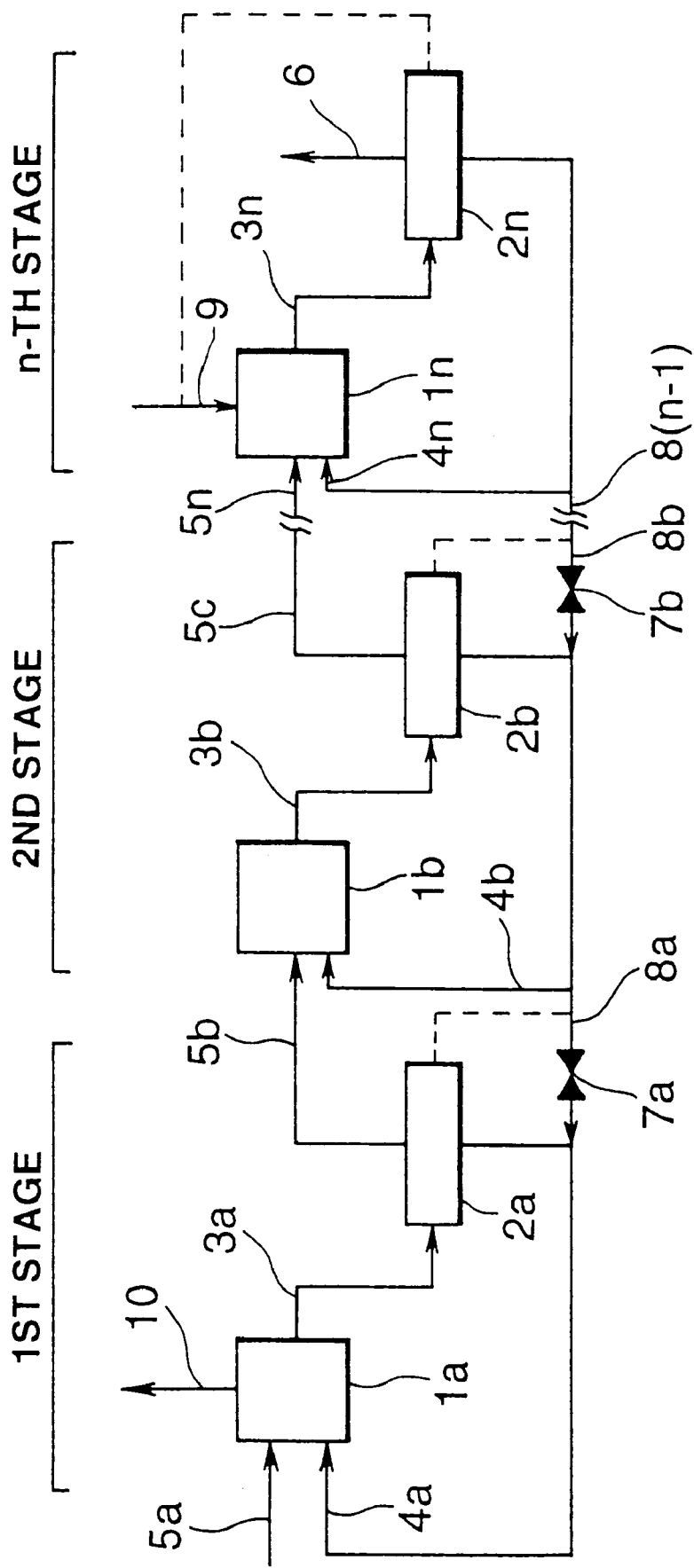
FIG. 1 is a flow sheet illustrating a hydrolysis method according to the invention.

The method for the continuous hydrolysis of organochlorosilane according to the invention uses a reaction system comprising multiple stages of hydrolysis reaction. Each stage includes a hydrolysis reactor for hydrolyzing the organochlorosilane in water to form a hydrolysis mixture and a phase separator for effecting phase separation on the hydrolysis mixture into a hydrolyzate and a hydrogen chloride-containing aqueous medium. The aqueous medium separated in the phase separator is circulated to the hydrolysis reactor. The hydrolyzate obtained in one stage is conveyed to the hydrolysis reactor of the subsequent stage to effect further hydrolysis.

The hydrolysis step of each stage according to the invention has an independent circulation loop for circulating the hydrogen chloride-containing aqueous medium separated in the phase separator to the hydrolysis reactor of the same stage. The organochlorosilane is fed into the first stage. The polysiloxane mixture resulting from hydrolysis reaction is delivered to the ensuing stage.

The organochlorosilane used as the starting reactant may be the same as used in conventional organochlorosilane hydrolysis process and is typically a diorganodichlorosilane such as dimethyldichlorosilane. The organic groups in organochlorosilane are not critical, and monovalent hydrocarbon groups such as alkyl, alkenyl, aryl and aralkyl groups are exemplary.

According to the invention, in such hydrolysis process, when the hydrogen chloride-containing aqueous medium circulating in each stage is consumed, the aqueous medium of the subsequent stage is fed to that stage, thereby maintaining the liquid level of aqueous medium in that stage substantially constant. Also, by feeding from the last stage an amount of water corresponding to the amount of water consumed in the overall reaction system, the amount of water fed to the overall reaction system of multiple stages is controlled. It is noted that the consumption of aqueous medium includes both the consumption by reaction and the consumption by entrainment in the hydrolyzate and gas evolved. The consumption of aqueous medium as used herein designates the total of these consumptions.

FIG. 1 illustrates one exemplary method of the invention. The organochlorosilane hydrolysis process shown in FIG. 1 is a counter-flow contact hydrolysis process consisting of n stages. The respective stages include a hydrolysis reactor $1a$, $1b$, ... $1n$ and a phase separator $2a$, $2b$, ... $2n$. These hydrolysis reactors $1a$, $1b$, ... $1n$ and phase separators $2a$, $2b$, ... $2n$ are connected through feed conduits $3a$, $3b$, ... $3n$ for feeding hydrolysis mixtures from the hydrolysis reactors $1a$, $1b$, ... $1n$ to the phase separators $2a$, $2b$, ... $2n$ and also connected through return conduits $4a$, $4b$, ... $4n$ for circulating and returning the hydrogen chloride-containing aqueous media separated from the hydrolysis mixtures fed into the phase separators $2a$, $2b$, ... $2n$ to the reactors $1a$, $1b$, ... $1n$. Then, the aqueous media separated in the phase separators $2a$, $2b$, ... $2n$ of certain stages are fed back to the reactors $1a$, $1b$, ... $1n$ of the relevant stages.

Also, an organochlorosilane feed conduit 5a is connected to the first stage reactor 1a for feeding organochlorosilane thereto. The phase separators 2a, 2b, . . . 2(n−1) of the respective stages excluding the last stage are connected to the reactors 1b, 1c, . . . 1n of the subsequent stages through transfer conduits 5b, 5c, . . . 5n, for feeding and transferring the hydrolyzates separated in the phase separators 2a, 2b, . . . 2(n−1) to the reactors 1b, 1c, . . . 1n. Note that of these components, phase separator 2(n−1) and reactor 1c are not shown in the figure. Then, the hydrolyzate of a certain stage is transferred to the reactor of the subsequent stage. A recovery conduit 6 is connected to the phase separator 2n of the last stage for recovering the hydrolyzate or polysiloxane separated from the aqueous medium in that phase separator 2n.

The return conduits 4a, 4b, . . . 4n are connected by interconnecting conduits 8a, 8b, . . . 8n having valves 7a, 7b, . . . incorporated therein. When water is consumed by hydrolysis reaction in each of the reactors 1a, 1b, . . . 1n, that is, when the level of hydrogen chloride-containing liquid lowers in each stage, the corresponding one of the valves 7a, 7b, . . . is opened so that the aqueous medium containing an amount of water corresponding to the amount of water consumed in a certain stage excluding the last stage is fed from the subsequent stage to that stage. The loss is made up in this way so that the amount of aqueous medium is maintained at a constant level in the respective stages excluding the last stage. A water supply conduit 9 is connected to the reactor in of the last stage for making up an amount of water corresponding to the amount of water consumed in the entire reaction system. Since the level of hydrogen chloride-containing aqueous medium in the respective stages is maintained constant, only the amount of water corresponding to the amount of water consumed by reaction is fed into the reaction system so that the amount of aqueous medium residing in the reaction system is kept constant.

Further, a hydrogen chloride recovery conduit 10 is connected to the first stage reactor 1a whereby substantially the entire amount of hydrogen chloride generated by hydrolysis reaction in the multiple stages is recovered as substantially anhydrous hydrogen chloride from the first reaction stage. It is noted that this anhydrous hydrogen chloride can be fed to an alkylchloride synthesis step and utilized as a reactant for the synthesis of alkylchloride.

Therefore, according to the above-described method, substantially the entire amount of the hydrogen chloride-containing aqueous medium generated by hydrolysis reaction is retained within the reaction system, the hydrolyzate and substantially anhydrous hydrogen chloride are produced, and the aqueous medium is not substantially discharged out of the reaction system.

The aqueous medium circulated in the first stage should preferably have a hydrogen chloride concentration of 35 to 45% by weight. There is a tendency that the viscosity of polysiloxanes increases at a hydrogen chloride concentration of less than 35% by weight, whereas the concentration of residual chloride increases at a hydrogen chloride concentration of more than 45% by weight. Subsequent to the first stage, the hydrogen chloride concentration in the circulating aqueous media may be gradually lowered. The hydrogen chloride concentration in the circulating aqueous media may be set at 10 to 25% by weight for the second stage, at 0.5 to 5% by weight for the third stage and at further lower levels for the fourth and later stages although these values are not limitative.

The reaction temperatures in the respective stages act on the rate of hydrolysis reaction and the rate of polycondensation and affect the physical properties and quality of polysiloxanes produced. Therefore, it is especially preferred that the temperature is from above 35° C. to 90° C. in the first stage and from above 10° C. to 60° C. in the second stage. If the reaction temperatures are outside these ranges, there is a likelihood that in the first stage, the hydrogen chloride concentration in the aqueous medium cannot be maintained in the above-specified range, adversely affecting the viscosity, dissolved chloride concentration and cyclic siloxane content and other factors; and in the second stage, the viscosity increases to an inconvenient level for operation due to the decomposition and polycondensation of cyclic polysiloxanes.

The reaction pressure of the first stage is preferably from above 0 kgf/cm$^2$G to 5.0 kgf/cm$^2$G. By maintaining the pressure within this range, it becomes easy to maintain the hydrogen chloride concentration in the aqueous medium. When the hydrolysis of the first stage is carried out under a higher pressure than in the alkylchloride synthesis step, it becomes easy to transfer the resulting anhydrous hydrogen chloride to the alkylchloride synthesis step. Therefore, in this preferred embodiment, the anhydrous hydrogen chloride recovered can be subjected in the gaseous state to alkylchloride synthesis.

In order that the invention be fully effective, at least three stages of hydrolysis, preferably at least four stages of hydrolysis are necessary. For removing a minor amount of chloride left in the polysiloxanes, it is possible to feed water as steam to the last stage of hydrolysis and set a reaction temperature of at least 110° C.

While the aqueous medium utilized in the invention is an aqueous medium containing hydrogen chloride whose concentration is maintained in the above-specified range, it is further advantageous to add methanol or a surfactant to aqueous medium in a well-known manner because the frequency of contact between chlorosilane and the aqueous medium is improved to increase the rate of reaction and stabilize the physical properties of polysiloxanes.

EXAMPLE

Examples of the invention are given below, together with Comparative Example, by way of illustration and not by way of limitation.

Example 1

Hydrolysis in Three Stages

Hydrolysis reaction of dimethyldichlorosilane was carried out using the reaction system shown in FIG. 1 wherein the number of hydrolysis stages was 3.

Each stage includes a reactor of glass with an internal volume of 7 liters equipped with an agitator and a phase separator of glass with an internal volume of 8 liters. An overflow pipe was connected to the top of the phase separator. A discharge port is disposed at the bottom of the phase separator for circulating the aqueous hydrogen chloride solution to the reactor. The first stage reactor is provided with a feed port for feeding the reactant, dimethyldichlorosilane. The third stage reactor is provided with a feed port for feeding water. The phase separator of each reaction stage is equipped with a level gage for monitoring the level of solution therein.

In this reaction system, dimethyldichlorosilane was fed to the first stage reactor at a rate of 24 kg/hr to start reaction. After 2 hours, reaction became steady, and the liquid level was maintained constant in the respective reaction stages. At this point, water was fed to the third stage reactor at a rate of 3.3 kg/hr.

In the first stage reactor, dimethyldichlorosilane and the aqueous hydrogen chloride solution circulating through the first hydrolysis loop were contacted for reaction while maintaining a reaction temperature of 45° C. In the first stage, a reaction pressure of 1.0 kgf /cm² was maintained. Anhydrous hydrogen chloride resulting from reaction was subjected to gas-liquid separation, worked up, and recovered while it was passed through a meter for measuring the recovered amount. After phase separation between a saturated aqueous hydrogen chloride solution and a dimethylpolysiloxane hydrolyzate in the first phase separator, the hydrolyzate was fed to the second reactor and the saturated aqueous hydrogen chloride solution was circulated to the first reactor again. The dimethylpoly-siloxane hydrolyzate obtained at this point had a viscosity of 4.5 mPa·s and a residual chloride concentration of 4.3%, and the aqueous solution circulated has a hydrogen chloride concentration of 39.8% by weight.

The dimethylpolysiloxane hydrolyzate fed to the second reactor was contacted with the aqueous hydrogen chloride solution circulating through the loop as in the first stage of hydrolysis while maintaining a reaction temperature of 30.7° C. After phase separation in the second phase separator, the hydrolyzate was fed to the third reactor. Like the first stage, the aqueous hydrogen chloride solution generated in this stage was circulated to the second reactor again. The hydrolyzate obtained at this point had a viscosity of 8.0 mPa·s and a residual chloride concentration of 210 ppm, and the aqueous solution circulated has a hydrogen chloride concentration of 19.5% by weight.

The hydrolyzate fed to the third reactor was contacted with the aqueous hydrogen chloride solution circulating through the loop as in the first and second stages while maintaining a reaction temperature of 70.4° C. After phase separation in the third phase separator, the dimethyl-hydrolyzate was recovered. Like the first and second stages, the aqueous hydrogen chloride solution generated in this stage was circulated to the third reactor again. The dimethyl-hydrolyzate had a viscosity of 8.1 mPa·s, a residual chloride concentration of 50 ppm, and a cyclic polysiloxane content of 63.8%. The aqueous solution circulated through the loop has a hydrogen chloride concentration of 1.49% by weight.

During the above reaction process, the level of liquid in each phase separator was monitored. The level of liquid in each phase separator was maintained constant by feeding from the subsequent stage the aqueous hydrogen chloride solution containing an amount of water corresponding to the amount of water consumed by reaction and by feeding to the third stage an amount of water corresponding to the reduced amount of water. No aqueous solution was discharged out of the reaction system. The amount of anhydrous hydrogen chloride recovered was 99.9% of the theoretical amount generated from dimethyldichlorosilane.

Example 2

Hydrolysis in Four Stages

Hydrolysis reaction of dimethyldichlorosilane was carried out using the reaction system shown in FIG. 1 wherein the number of hydrolysis stages was 4. Each stage included a reactor and a phase separator as in Example 1. The level of solution in the phase separator of each stage was monitored as in Example 1.

In this reaction system, dimethyldichlorosilane was fed at a rate of 24 kg/hr to the first stage reactor which was controlled to a pressure of 3.0 kgf/cm² whereby hydrolysis reaction was started. After reaction became steady, the reaction temperature was maintained at 71.0° C. in the first stage, 30.7° C. in the second stage, 53.0° C. in the third stage, and 68.5° C. in the fourth stage. The aqueous hydrogen chloride solutions had a hydrogen chloride concentration of 39.8%, 24.4%, 3.0%, and 0.5% in the first, second, third, and fourth stages, respectively. The aqueous hydrogen chloride solution was independently circulated in each stage. Thereafter, the volume ratio of the dimethyl-hydrolyzate and the aqueous hydrogen chloride solution in the phase separator of each stage was determined. The level of liquid in each phase separator was maintained constant by feeding the aqueous hydrogen chloride solution corresponding to the reduced amount of water from the subsequent stage.

The above process yielded anhydrous hydrogen chloride and the dimethyl-hydrolyzate which had a viscosity of 3.5 mPa·s and a residual chloride concentration of 5.6% in the first reaction step, a viscosity of 9.0 mPa·s and a residual chloride concentration of 530 ppm in the second reaction step, a viscosity of 9.5 mPa·s and a residual chloride concentration of 150 ppm in the third reaction step, and a viscosity of 9.7 mPa·s, a residual chloride concentration of less than 1 ppm and a cyclic polysiloxane content of 64.7% in the fourth reaction step. No aqueous solution was discharged out of the reaction system. Anhydrous hydrogen chloride was recovered in an amount of 99.9% of the theoretical amount generated from dimethyldichlorosilane.

Comparative Example

Hydrolysis reaction of dimethyldichlorosilane was carried out by a two-stage hydrolysis process and a one-stage neutralization process.

Reaction was stared in a first hydrolysis reactor by feeding dimethyldichlorosilane at a rate of 24 kg/hr and a 39.8 wt % aqueous hydrogen chloride solution at a rate of 5.0 kg/hr thereto. Hydrolysis was effected in the first reactor at a temperature of 40° C. After anhydrous hydrogen chloride generated was separated, the dimethyl-hydrolyzate and the aqueous hydrogen chloride solution were separated from each other in the phase separator. The dimethyl-hydrolyzate was fed to a second hydrolysis reactor. The aqueous hydrogen chloride solution was fed to a stripping column where hydrogen chloride was recovered. Water was fed at a rate of 7.2 kg/hr to the second reactor where the dimethyl-hydrolyzate fed from the preceding stage was subject to hydrolysis at a reaction temperature of 30° C. After separation in the phase separator, the dimethyl-hydrolyzate was fed to a neutralizing step and the aqueous hydrogen chloride solution was discharged out of the reaction system for disposal. In the neutralizing step, an aqueous solution of 2.1 wt % sodium carbonate was added to the dimethyl-hydrolyzate and reaction was effected at 70° C. whereby the chloride left in the dimethyl-hydrolyzate was removed. After neutralization, the aqueous solution was discharged out of the reaction system and disposed of.

The above process yielded a dimethyl-hydrolyzate having a viscosity of 9.6 mPa·s, a residual chloride concentration of less than 1 ppm and a cyclic polysiloxane content of 68.4%. Anhydrous hydrogen chloride was recovered in an amount of 95.4% of the theoretical amount generated from dimethyldichlorosilane.

According to the method of the invention, organopolysiloxane of quality is obtained, substantially the entire amount of aqueous medium is retained within the reaction system, and substantially the entire amount of hydrogen chloride generated from the entire reaction system is recovered as substantially anhydrous hydrogen chloride.

Japanese Patent Application No. 154448/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for the continuous hydrolysis of organochlorosilane to produce organopolysiloxane and anhydrous hydrogen chloride, comprising using a reaction system comprising at least three stages of hydrolysis reaction, wherein each stage comprises a hydrolysis reactor for hydrolyzing the organochlorosilane to form a hydrolysis mixture and a phase separator for effecting phase separation of the hydrolysis mixture into a hydrolyzate and a hydrogen chloride-containing aqueous medium, wherein the aqueous medium is circulated from a phase separator to the hydrolysis reactor of the previous stage, wherein the hydrolyzate obtained in one stage is conveyed to the hydrolysis reactor of the subsequent stage to effect further hydrolysis, wherein the organochlorosilane is fed into the hydrolysis reactor of the first stage and wherein the hydrogen chloride produced by the system is recovered as gaseous anhydrous hydrogen chloride from the first stage, wherein the aqueous medium fed to a particular stage corresponds to the amount of water consumed in the particular stage, wherein the aqueous medium for the particular stage is derived from the subsequent stage, wherein the hydrogen chloride produced at a particular stage is transferred to the previous stage and the hydrolyzate produced at a particular stage is transferred to the subsequent stage, wherein an amount of water corresponding to the amount of water consumed in the overall reaction system is fed in the last stage, wherein hydrogen chloride generated in multiple stages of hydrolysis reaction is recovered as substantially gaseous anhydrous hydrogen chloride from the first stage and hence, from the reaction system.

2. The method of claim 1 wherein the aqueous medium separated from the hydrolyzate resulting from hydrolysis reaction in the first stage has a hydrogen chloride concentration of 35 to 45% by weight.

3. The method of claim 1 wherein hydrolysis reaction is effected at a temperature from above 35° C. to 90° C. in the first stage and at a temperature from above 10° C. to 60° C. in the second stage.

4. The method of claim 1 wherein hydrolysis reaction of the first stage is effected under a pressure from more than 0 $kgf/cm^2G$ to 5.0 $kgf/cm^2G$.

5. The method of claim 1 wherein the organochlorosilane is dimethyldichlorosilane.

6. A method for the continuous hydrolysis of organochlorosilane to produce organopolysiloxane and anhydrous hydrogen chloride which is fed to an alkylchloride synthesis step to use as a reactant for the synthesis of alkylchioride, comprising using a reaction system comprising at least three stages of hydrolysis reaction, wherein each stage comprises a hydrolysis reactor for hydrolyzing the organochlorosilane to form a hydrolysis mixture and a phase separator for effecting phase separation of the hydrolysis mixture into a hydrolyzate and a hydrogen chloride-containing aqueous medium, wherein the aqueous medium is circulated from a phase separator to the hydrolysis reactor of the previous stage, wherein the hydrolyzate obtained in one stage is conveyed to the hydrolysis reactor of the subsequent stage to effect further hydrolysis, wherein the organochlorosilane is fed into the hydrolysis reactor of the first stage and wherein the hydrogen chloride produced by the system is recovered as gaseous anhydrous hydrogen chloride from the first stage, wherein the gaseous anhydrous hydrogen chloride produced in the hydrolysis reactor of the first stage is fed as a reactant to an alkylchloride synthesis step for the synthesis of at least one alkylchloride, wherein the aqueous medium fed to a particular stage corresponds to the amount of water consumed in the particular stage, wherein the aqueous medium for the particular stage is derived from the subsequent stage, and wherein the hydrogen chloride produced at a particular stage is transferred to the previous stage and the hydrolyzate produced at a particularstage is transferred to the subsequent stage, wherein an amount of water corresponding to the amount of water consumed in the overall reaction system is fed in the last stage, wherein hydrogen chloride generated in multiple stages of hydrolysis reaction is recovered as substantially gaseous anhydrous hydrogen chloride from the first stage and hence, from the reaction system.

7. The method of claim 6, wherein the aqueous medium separated from the hydrolyzate resulting from the hydrolysis reaction in the first stage has a hydrogen chloride concentration of 35 to 45% by weight.

8. The method of claim 6, wherein the hydrolysis reaction is effected at a temperature from above 35° C. to 90° C. in the first stage and at a temperature from above 10° C. to 60° C. in the second stage.

9. The method of claim 6, wherein the hydrolysis of the first stage is effected under a pressure of from more than 0 $kgf/cm^2G$ to 5.0 $kgf/cm^2G$.

10. The method of claim 6, wherein the organochlorosilane is dimethyldichlorosilane.

11. The method of claim 1, wherein the substantially the entire amount of the aqueous media separated in the phase separators is retained in the reaction system.

12. The method of claim 1, wherein an organopolysiloxane mixture is produced which comprises a cyclic polysiloxane content of greater than 55%.

13. The method of claim 6, wherein an organopolysiloxane mixture is produced which comprises a cyclic polysiloxane content of greater than 55%.

14. The method of claim 1, wherein an organopolysiloxane mixture is produced which comprises a residual chloride concentration of less than 100 ppm.

15. The method of claim 6, wherein an organopolysiloxane mixture is produced which comprises a residual chloride concentration of less than 100 ppm.

16. The method of claim 1, further comprising at least four stages of hydrolysis in the reaction system.

17. The method of claim 6, further comprising at least four stages of hydrolysis in the reactions system.

* * * * *